United States Patent [19]
Horioka

[11] 3,890,697
[45] June 24, 1975

[54] METHOD OF FIXING MEMBERS WITH BOLTS

[75] Inventor: Masaki Horioka, Yokohama, Japan

[73] Assignee: Nippon Kokan Kabushiki Kaisha, Tokyo, Japan

[22] Filed: Oct. 25, 1973

[21] Appl. No.: 409,683

[30] Foreign Application Priority Data
Oct. 25, 1972   Japan.............................. 47-106167

[52] U.S. Cl.............. 29/526; 29/DIG. 46; 52/758 F
[51] Int. Cl............................................ B23p 19/00
[58] Field of Search ...... 29/428, 446, 526, DIG. 46; 52/758 F

[56] References Cited
UNITED STATES PATENTS

| | | |
|---|---|---|
| 2,086,667 | 7/1937 | Fletcher................. 29/DIG. 46 UX |
| 3,224,086 | 12/1965 | Balamuth............................. 29/525 |
| 3,521,348 | 7/1970 | Pruder et al....................... 29/526 X |
| 3,526,030 | 9/1970 | Maropis et al................... 29/526 X |
| 3,650,016 | 3/1972 | McMaster............................. 29/526 |

Primary Examiner—Charlie T. Moon
Attorney, Agent, or Firm—Flynn & Frishauf

[57] ABSTRACT

A method of securing at least two large members together with bolts, the improvement comprising applying vibratory energy to at least one of the members being fastened together jointly with the tightening of the bolt, thereby greatly increasing the fastening force and improving the fatigue strength of the bolt and stability of the resultant structure.

8 Claims, 8 Drawing Figures

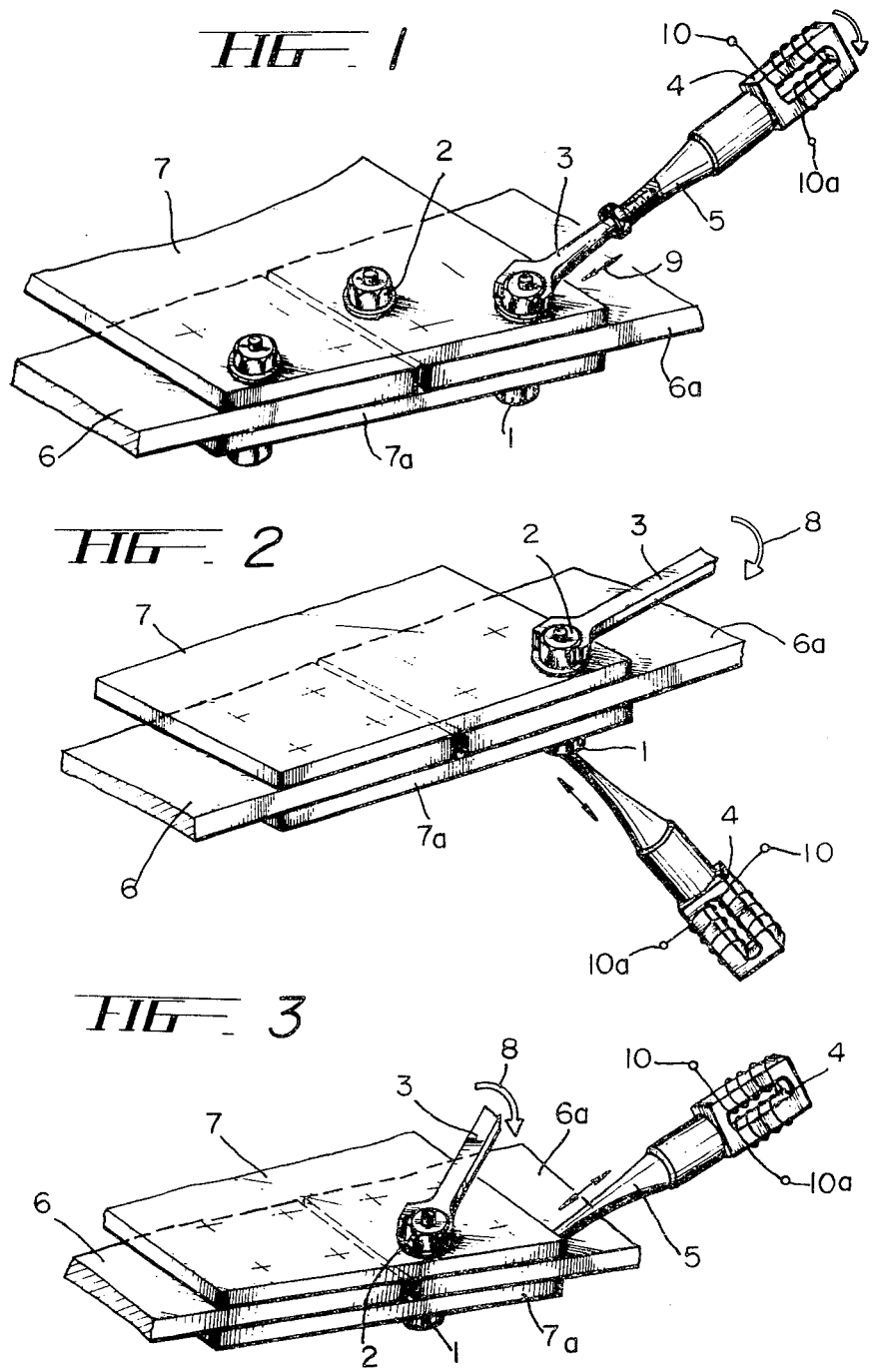

METHOD OF FIXING MEMBERS WITH BOLTS

This invention relates to an improved method of fixing members of large scale structures to one another with friction force, and more particularly, to a method wherein strong friction force produced by a bolt-nut fastening means is increased greatly by the introduction of vibration energy of super voice frequency to ultrasonic frequencies.

In steel structures, it is well known to use a high tension bolt-nut for obtaining a high strength coupling with the friction force on the contact face between the members. The said high tension bolt-nut is fastened by such tools as a torque wrench, impact wrench, etc. mutually or with air pressure and the fastening force thereof applies a high vertical force on the contact face of the members.

However, this prior method is defective in that rust existing on the material surface will substantially decrease the friction force between the members and is likely to cause the slipping of the said contact face. The materials used are bound to have a rusty surface although such rusty materials would not be used by choice. In order to compensate for the weak friction force and to prevent said slipping, it was necessary to rely upon a powerful fastening force of the high tension bolt-nuts. Therefore, the tension applied to the said bolt-nut becomes excessive and the axial force of said bolt-nut would be lowered with a secular change after said fastening operation is finished, as shown in FIG. 7. This necessitates a refastening operation after a certain time interval. In large scale steel structures a great number of tension bolt-nuts are used. To refasten such number of bolt-nuts one by one would be complicated and unduly time consuming.

Moreover, the friction force among the members is not strong and would bring about undesirable tension on the bolt-nuts. Thus the obtained friction coupling would show lowered strength at the coupling as shown by the lower curve in FIG. 8 when a repeating load is applied on the same for a long period of time. The slip coefficient (slip load of coupling ± total shaft force of bolt) would become greatly lower than the initial design standard (such as 0.35). Therefore, while such high tension bolts are not usable for face contact among the members where repeating loads would be applied for a long duration of time, the scope of application for such bolts has been necessarily limited, or special and complicated coupling systems has been required. As has been explained, a great shaft force was also required for fastening of high tension bolts as well as an excessively high fastening torque because of the great friction force required among the members to be coupled. This inevitably makes the work efficiency worse. As the structures are becoming larger in recent times, the couplings are also becoming larger, naturally necessitating the use of larger sized grip type bolts of from 25mm to 32 – 36mm in diameter. The torque required for fastening in these instances would become from conventional 60kg-m to 120 – 150kg-m. It is not easy to obtain a fastening torque of more than 80kg-m even with the use of electric air pressure impact wrenches. Accordingly, the fastening operations by manual means or with special tools would become extremely difficult.

SUMMARY OF THE INVENTION

The present invention has been contrived through extensive research and numerous experiments in order to obviate the disadvantages and defects of the prior method as afore-mentioned. The features lie in the introducing of a suitable vibration energy of super-voice frequency to ultrasonic wave frequencies to at least one of the members being fastened together during the fastening operation.

The object of this invention is to provide a method enabling reduction of the fastening torque for bolt-nut connection.

Another object of this invention is to provide a method for obtainig a strong friction coupling even with a manual fastening operation.

A further object of this invention is to provide a method for protecting the bolt-nut from the lowering of shaft strain of said bolt-nut and improving fatigue strength of said bolt-nut thereby, consequently, securing stability of the structures themselves without refastening.

Other objects and advantages will be apparent from the following description taken in conjunction with the accompanying drawings in which:

FIGS. 1 and 2 illustrate application of vibratory energy to a bolt during tightening.

FIG. 3 illustrates an embodiment of the present invention.

Detailed Description

Figure 4:
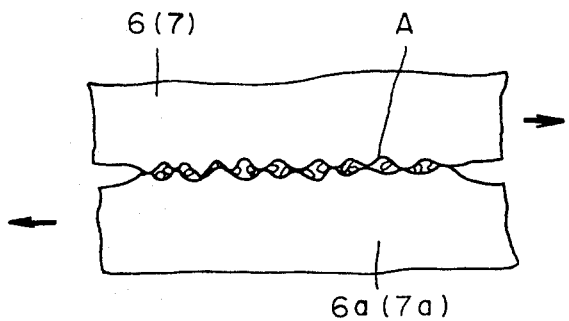
FIG. 4 shows an enlarged typical manner of the contact face between the members connected together by the prior art means.

Now referring to the accompanying drawings, plates (6) and (6a) to be joined are placed on a level and the butt line of said plates (6) and (6a) is put between a side plate (7) and another one (7a). Then these members are fastened with required bolt-nuts, which are operated by a hand or mechanical power. Such a mechanism is prior art.

In this invention, the fastening of members with bolt-nuts or a simple screw bolt is carried out jointy with impressing on at least one of the members a suitable vibration energy given by a power supply of appropriate frequency. Such a frequency should be selected from the range of supervoice frequency to ultrasonic wave frequencies and said vibration energy can be obtained through a suitable vibrator or transducer such as an electrostrictive type or magnetostrictive transducer. In the accompany drawings, each of said transducers (4) is an example of said magnetostrictive type and said selected frequency is applied to said transducer (4) through the terminals (10) and (10a). In such a case, input power to said transducer (4) is determined in accordance with the required vibration energy (9) in consideration of the fastening force to members with said bolt-nut or simple screw bolt. It is needless to say that said required fastening force is determined by the size of members (6), (6a) and (7), (7a) and bolt-nuts (1) and (2). If the required vibration energy is not obtained by a single transducer, two or more transducers of may be employed in a known arrangement. For example, said energy is impressed to the fastening tool (3) through a horn shaped member (5) screwed to said tool (3), in FIG. 1. In FIG. 2, said energy is impressed on the other end of said bolt and in FIG. 3, to one of said members being fastened. In every case, the place of impression of said energy should be selected in connection with resonance length of the employed frequency, as is well-known. The above horn (5) may be omitted when the required vibration energy is relatively small.

The action and effect of this invention are as follows. First, an enlarged typical state of a contact face between the members by the prior art means, i.e., friction coupling with bolt and nuts which are fastened by a hand or mechanical means, is shown in FIG. 4. That is, said contact face is very irregular and presents a saw tooth-like shape, which looks as if one member and another member bite each other through rust and particles thereon. For this reason, the substantially contacting area is no more than about 15 percent of a whole area to be contacted and strong fastening force by a high tension bolt and nut has been required in the prior art. Even though said bolt-nut is fastened by a high-power mechanical means it is not possible to prevent face-slipping between said members.

Figure 5:
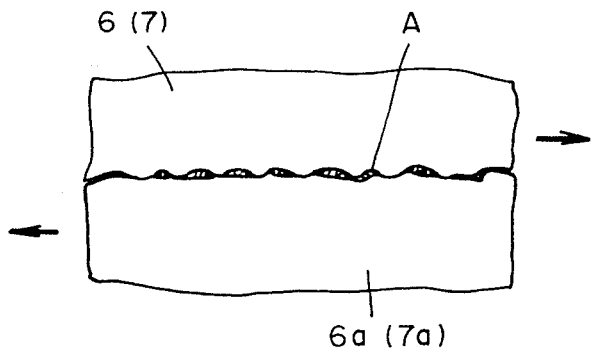
FIG. 5 shows an enlarged typical manner of the contact face between the members connected together by this invention.
Figure 6:
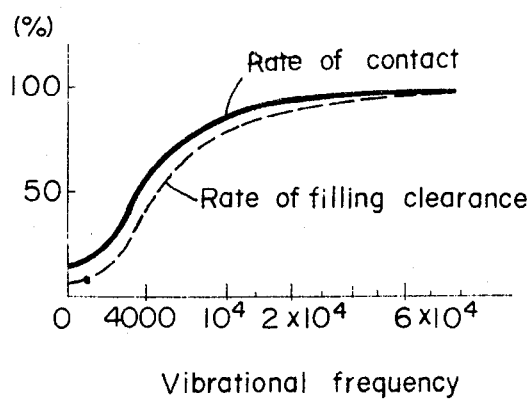
FIG. 6 is a graph showing the relation between vibrational frequency and rate of contact or rate of filling clearance based on this invention.

According to the method of the present invention, vibrating energy is impressed to one of the members to be fastened. Rust and other particles on the contact face of the members are destroyed and become fine thereby. The resultant flatness of said contact face is obtained as shown in FIG. 5. Because the sharp-point of said saw tooth-like shape is smashed by elastic vibration based on said vibrating energy the fastening resistance of said bolt is remarkably decreased thereby. Thus, when vibrating energy is impressed jointly with the fastening of said bolt, the fine particles (A) on said contact face are filled into clearance thereof. This results in the increasing of rate of the said contact and the rate of filling said clearance. Said rate increases as the applied frequency becomes high. Such a relation between said rate and said frequency is as shown in FIG. 6. In the conventional fastening method where no vibrating energy is impressed, the rate of contact between the members was as low as 15 percent or less, while with the method of the present invention, i.e., the using of vibrating energy jointly with the fastening of said bolt, both rate of contact and rate of filling clearance reach about 50 percent in the case of supervoice frequency, i.e., 4000 $H_z$ and about 90 percent in the case of ultrasonic wave frequencies, i.e., $6 \times 10^4 H_z$. In the experiment carried out by the present inventors, the maximum frequency applied was about 60,000 $H_z$ at which level of the said rate took as approximate flat curve, and which was in the inventors' opinion sufficient to meet the practical purposes. From the above mentioned performance, the friction coupling force of the members themselves becomes so strong as to render it unnecessary to apply a great shaft strain to employed bolt for fastening the members together. Accordingly, the lessening of stress is suitably prevented and the fatigue strength of the bolt is improved remarkably.

To impress said vibrating energy to one of the members, as mentioned above, also brings good results in the fastening operation. That is to say a gap is formed between said bolt (including conventional washer) and members with the impressing of said vibrating energy, and consequently, the coefficient of friction between them decreases. This eases the rotational operation of said bolt, and more over, brings the decreasing of the fastening torque with the increasing of the rate of said contact between the members. According to many experiments, said torque required becomes less than 1/10 of that when no vibrating energy is impressed, so that a special tool such as an impact wrench does not have to be employed for large sized bolts, but only simple and easy operations are required. This automatically leads to simplified and more efficient work.

The examples of the present invention are given as follows in comparison with the conventional method.

EXAMPLE 1:

Two high tension bolt-nuts of 32mm diameter and initial shaft strain of $25 \times 10^{-6}$ were used to join the two plates of 50mm thickness with another plate of 25mm thickness in a sandwich manner to obtain a friction coupling. The high tension bolt-nuts were fastened by the use of an impact wrench and the torque required was 150 kg-m, twice fastened for the duration of 30 minutes. The shaft strain of an bolt lowered down to $20 \times 10^{-6}$ or below after 25 minutes as shown by the lower curve in FIG. 7. It was understood that said stress falls as time passes. At the same time, the amplitude of repeating load also falls as said repeating number increased. This effect is as shown by the lower curve in FIG. 8. In such a case, it was impossible to keep the established standard value of 0.35 in respect of slip coefficient.

Figure 7:
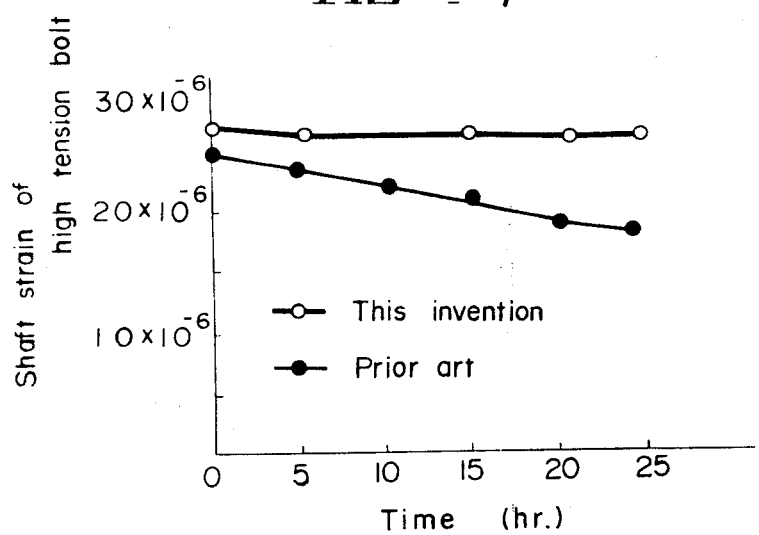
FIG. 7 is a graph showing shaft strain of employed high tension bolt changing with time in comparison with that of the prior art.
Figure 8:
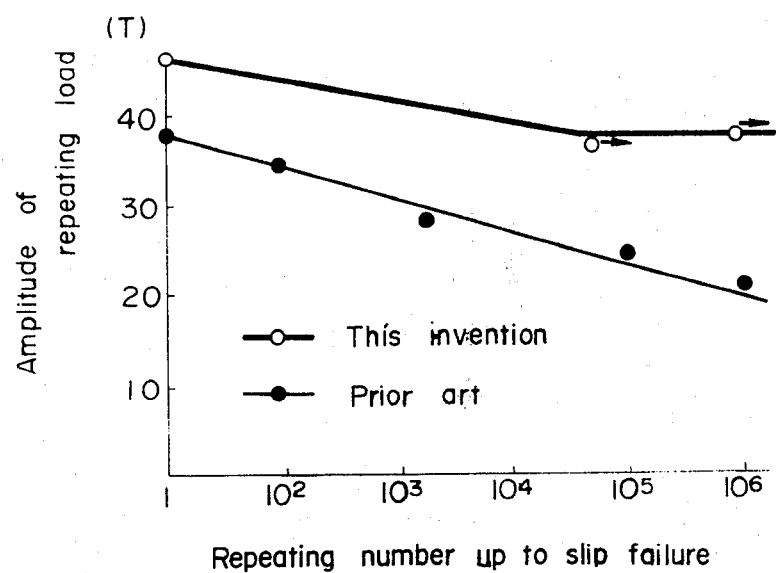
FIG. 8 is a graph showing the relation between amplitude of repeating load and repeating number up to slip failure on a friction coupling based on this invention in comparison with that of the prior art.

Next, vibrating energy based on input of a frequency of $2 \times 10^4$ $H_z$ with 150 watts was impressed as shown in FIG. 1 to the same mechanism as mentioned above, jointly with the fastening of said bolt. The torque required was 5 Kg-m and only one operation for 30 seconds was done. This indicated that this operation was far easier and earlier than that of the above method. It was understood that said shaft strain of the bolt was little changed and stable in comparison with that of prior art, as shown in FIG. 7. Also, the amplitude of repeating load was remarkably improved, and more particularly, in the repeating number of more than about 15,000 times, as shown in FIG. 8, while said slip coefficient was maintained at more than 0.35 which is said standard value.

EXAMPLE 2

The bolt and the plate of the Example 1 were used and said vibrating energy based on input of a frequency of $4 \times 10^4 H_z$ with 150 watts was impressed to the head of said bolt as shown in FIG. 2 and fastened by a torque wrench. The torque required was about 5 kg-m and the fastening was completed with one operation for about 30 seconds. The same results as those obtained in Example 1 were seen in respect of said shaft strain, said amplitude of repeating load and said fatigue strength.

EXAMPLE 3

The conditions similar to those in example 1 were employed jointly with the impressing of said vibration energy based on input of a frequency of $3\times10^4 Hz$ with 150 watt, as shown in FIG. 3. The same results as those of example 1 were obtained.

EXAMPLE 4

The conditions similar to those in example 1 were employed jointly with the impressing of said vibrating energy based on input of a frequency of $4,000 Hz$ as shown in each of FIG. 1 to 3. The result obtained was that the fastening torque required was 80 kg-m and one operation. Compared to the above mentioned examples, the torque required was slightly larger but still this was about 1/2 of the torque required in the conventional method. The shaft strain as shown in FIG. 7 and the amplitude of repeating load as shown in FIG. 8 were obtained.

Thus, the number of employed transducers and the amount of impressed vibrating energy should be planned in accordance with the kind, quality and size of members and bolts. The employed frequency is selected from the range of supervoice frequency to ultrasonic wave frequencies, i.e., about $4,000 Hz$ to $60,000 Hz$ by the above requirements.

We claim:

1. A method of securing at least two members together with at least one threaded bolt, comprising:

placing said at least two members together with respective surfaces thereof in contact with each other;

threadably fastening said members together with a threaded bolt which passes through at least one of said members; and applying vibratory energy to at least one of said members jointly with the tightening of said threaded bolt.

2. The method as set forth in claim 1 wherein said at least one bolt passes through said at least two members and threadably engages a nut for fastening said members together.

3. The method as set forth in claim 1 wherein said at least two members have substantially flat surfaces which are placed in contact with each other.

4. The method as set forth in claim 1 comprising fastening said members together with a plurality of said bolts.

5. A method as set forth in claim 1 wherein at least three members are fastened together, one of said members being sandwiched between two other of said members, said at least one bolt passing through at least two of said members.

6. The method as set forth in claim 5 wherein said at least one bolt passes through all three of said members and threadably engages a nut for fastening said members together.

7. The method as set forth in claim 1 wherein said vibrating energy is obtained by means of a transducer, and comprising supplying transducer with an input having a frequency selected within the range of supervoice frequency to ultrasonic wave frequency.

8. The method as set forth in claim 7 wherein said selected frequency is within the range of about 4,000 Hz to about 60,000 Hz.

* * * * *